Dec. 5, 1933.  H. K. RADER  1,938,194
APPARATUS FOR EXPANDING CONDUITS
Filed Feb. 19, 1930  2 Sheets-Sheet 1
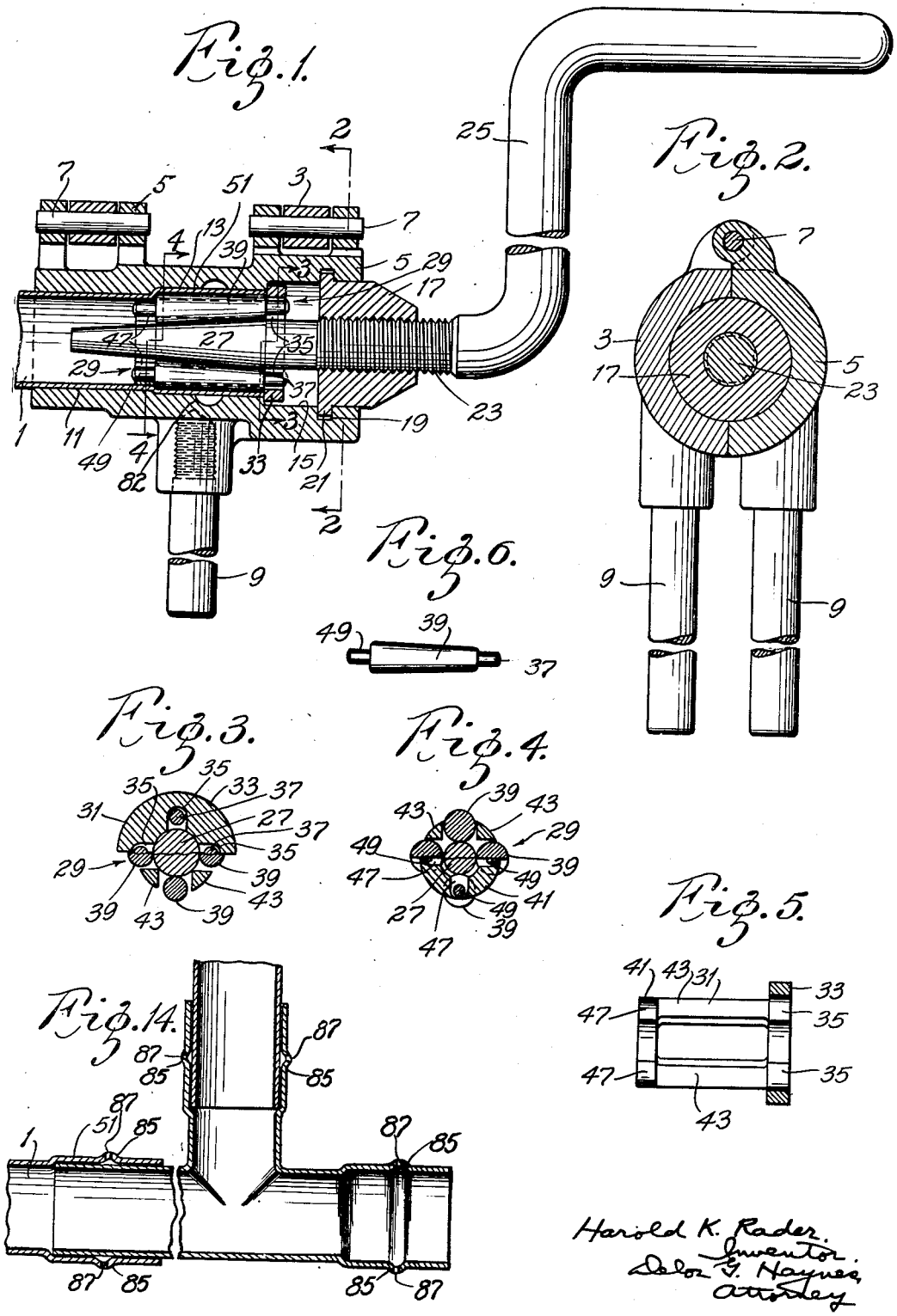

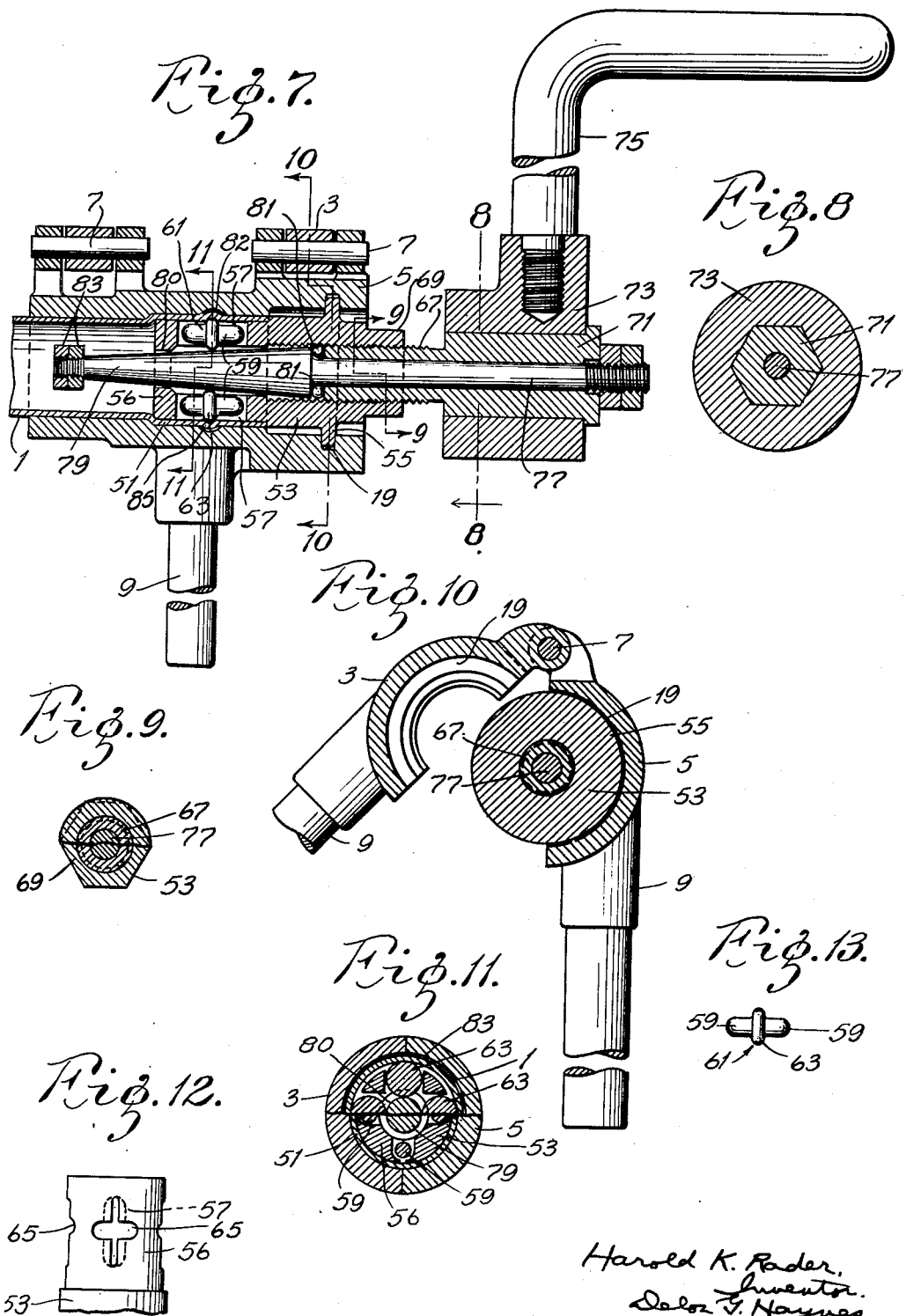

Patented Dec. 5, 1933

1,938,194

UNITED STATES PATENT OFFICE

1,938,194

APPARATUS FOR EXPANDING CONDUITS

Harold K. Rader, Port Huron, Mich., assignor to Mueller Brass Co., Port Huron, Mich., a corporation of Michigan Application February 19, 1930. Serial No. 429,598

8 Claims. (Cl. 153—82)

This invention relates to apparatus for expanding conduits such as pipes, tubes, fittings, and the like.

Among the several objects of the invention may be noted the provision of a portable expander which may be carried to a field of operation and be used for forming a threadless form of pipe connection adapted to be made at any point where a tube, for example, happens to be cut off or at any point where a fitting or the like happens to be located; and the provision of apparatus of the class described which is particularly simple to manipulate and apply, which is more effective in use, and which is adapted to be more economically fabricated. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a longitudinal section of a tube showing a first operation in making an enlargement therein by means of an expanding tool;

Fig. 2 is a cross-section taken on line 2—2 of Fig. 1;

Fig. 3 is a partial cross-section taken on line 3—3 of Fig. 1;

Fig. 4 is a partial cross-section taken on line 4—4 of Fig. 1;

Fig. 5 is a longitudinal section of a holding spider for certain expanding rolls;

Fig. 6 is an elevation of one of said expanding rolls;

Fig. 7 is a view similar to Fig. 1 showing the application to the tubing of a groove-rolling tool;

Fig. 8 is a cross-section taken on line 8—8 of Fig. 7;

Fig. 9 is a cross-section taken on line 9—9 of Fig. 7;

Fig. 10 is a cross-section taken on line 10—10 of Fig. 7, showing a certain clamp in open position;

Fig. 11 is a cross-section taken on line 11—11 of Fig. 7;

Fig. 12 is a plan view of a support for certain grooving rollers;

Fig. 13 is a detailed side elevation of one of said grooving rollers; and

Fig. 14 is an illustration showing examples of expanded products.

Similar reference characters indicate corresponding parts throughout the several views of the drawings.

Referring now more particularly to Fig. 1, there is illustrated at numeral 1 a length of tubing which is representative of the class of conduit to which the present invention applies. It is to be understood that the tubing may be in the form of a T, elbow, union, or the like (see also Fig. 14). It is preferable that the material comprising the element which numeral 1 represents be ductile to the extent that it may be expanded and rolled.

Heretofore, elements such as pipes, T's, nipples, elbows, couplings, and the like have been threaded interiorly and exteriorly in order to form couplings or joints. In many instances these threads were applied to at least one member of the coupling at the field of operation, and in many other instances at the factory or point of fabrication.

It has been found that conduit members of the class described can be better joined by effecting a telescoping connection. In order to effect such a connection for a given size of tubing, one element of the same is constituted a receiving member by expanding or deforming the same so that the opposite member may fit into or with it by telescoping. The expansion preferably should be enough that the final coupling has a substantially smooth bore; that is to say, the expansion should be about the thickness of the wall of the entering member. An example of this is shown in Fig. 14.

Fig. 14 also shows how the invention herein may be applied to an arm of a T. This showing is made by way of example only, it being understood that the T may be expanded on all arms at the factory. The T, like the other fittings referred to herein, is formed of relatively thin, ductile material such as copper, brass, or the like.

The invention provides means adapted to effect the desired expanding operation either at the field of use of the tubing or the like, or at the point of fabrication. Field use of the invention is preferably made where lengths of tubing are to be cut off or otherwise changed. In other instances, such as, for example, in the expanding of coupling elements, T's, and the like, such expanding is preferably accomplished at the factory or point of fabrication.

The expanding operation described herein includes both the expanding of the tube per se and a further expanding to provide a bead or channel in the member for the reception of suitable sealing material, such as solder or the like.

The portable equipment for field operations comprises a die clamp having hemicylindrical jaws or dies 3, 5 suitably hinged along a pair of edges at pins 7 and having handle grips 9, which grips in closed position of the jaws 3, 5 may be held together with one hand or otherwise.

The jaws 3, 5 are bored out as shown at numeral 11, to receive one end of the member 1, and counter-bored as shown at numeral 13 for permitting the expansion of the end of said member 1 within jaws 3, 5. A second counter-bore 15 is adapted to receive and tightly clamp a nut 17 (Fig. 2). A recess 19 in the counter-bore 15 engages a flange 21 of the nut 17 for longitudinally positioning said nut. Threaded into the nut 17 is a lead-screw 23 which carries exteriorly a crank 25 and interiorly a tapered mandrel or arbor 27.

Prior to clamping the jaws 3, 5 over the nut 17 and mandrel 27, there is placed in the then unexpanded member 1 a roller spider assembly 29, the details of which are shown more particularly in Figs. 3–6. This expanding assembly 29 comprises a spider 31 having an endwise flange 33 in which are formed suitable radial slots 35 for accommodating gudgeons 37 formed at the small ends of a quadruple set of tapered expansion rollers 39. The flange 33 is connected with a smaller flange 41 by spacer pillars 43. The pillars 43 permit the interpositioning therebetween of the expanding rolls 39. The smaller flange 41 is provided with radial slots 47 for gudgeons 49 at the large ends of said expansion rolls 39.

It will thus be seen that there is provided a roll unit 29 which may be placed in the end of the unexpanded tube 1 before the application of the clamps 3, 5 and associated parts. The diameter of the smaller flange 41 is such as to permit this internal application of the unit 29; whereas the larger flange 33 abuts the ends of the tube 1, thereby predetermining the width of expanded material.

The first operation in manipulating the invention is to place the roll assembly 29 in the end of the unexpanded pipe 1. It will be seen that the radial slots 35, 47 permit the rolls to be positioned interiorly.

Next, with the lead-screw 23 backed in the nut 17, the mandrel 27 is interposed within the nest of rollers 39. At the same time the nut 17 is positioned with its collar 21 in the recesses 19 of the clamps 3, 5, and said clamps are clamped into position over the end of the pipe 1. The nut 17 is thus held against rotational movement, albeit leaving the roll or spider assembly 29 free to rotate or independently movable with respect to said die or clamps 3, 5 or the nut 17. Thereafter the handle grips 9 are held with one hand and the crank 25 turned with the other. This results in axial advance of the mandrel 27 at the same time that it rotates. Its axial advance causes a spread of the rollers 39 and the turning thereof effects an epicyclic rolling action of said rollers interiorly of the tube 1. Hence the end of the tube is expanded and provided with a smooth cup-like end. It will be understood that the shape of the cup may be varied by varying the shapes of the rollers 39; but I prefer that the cup be at first substantially cylindrical. In order to accomplish this the taper of the mandrel 27 and that of the rollers 39 is arranged to provide the cylindrical shape (see Fig. 1). The operator knows when the operation is complete because the crank 25 automatically jams when the mandrel 27 is advanced the amount determined by the material of the tube 1 filling the counter-bore 13 of the die.

Thereafter the grips 9 are released, the clamps 3, 5 opened and the mandrel 27 and nut 17 withdrawn. Under some conditions it may be desirable to retract the lead screw 23 a turn or so before applying the clamps 3, 5 in order that any wedging of the mandrel may be relieved.

As hereinbefore indicated, the above operation places a cup-shaped expanded receiving portion on the tubing adapted to receive a smaller entering portion of the same or other kind of tubing.

In order that a tight joint may be made, it is next desirable that a bead or recess be formed in the cup shape 51, in which an opening (or openings) may be formed, for introducing sealing material such as solder for sealing the juxtaposed surfaces between the entering and receiving members. In order to accomplish this, the device shown in Figs. 7–13 is used at the end. This device makes use of the same clamping members 3, 5, 9, but has a different interior tool which comprises a spider 53 in the nature of a nut having a flange 55 for longitudinal positioning by fitting into said recess 19. However, in this case the spider 53 is not adapted to be absolutely clamped stationary as was the nut 17. It is only frictionally held stationary but may be turned upon applying suitable force. On the other hand, the clamps 3, 5 positively clamp on the cup-shape end 51 of the tube 1.

The spider 53 is rotatable in said cup 51, having an extension 56 in said cup. The extension 56 has recesses 57 for carrying gudgeons 59 of beading rolls 61. Beads 63 of said rolls 61 extend through openings 65 of the extension 56 so as to engage the interior of the expanded cup 51.

The spider 53 is threaded to receive a lead-screw 67 and the rear end 69 of the spider is formed hexagonally (see Fig. 9). The lead-screw 67 extends outwardly to form a nut 71 on which is slidably mounted a hub 73 of a crank 75. The hub 73 comprises a wrench which engages the nut 71 and may be temporarily slipped to the left so as to engage the nut 69 which is of the same hexagonal size and shape as the nut 71.

Rotatably mounted within a bored portion of the lead-screw 67 is a stem 77 of a mandrel 79. Bearings 81 permit free relative motion between the mandrel 79 and the lead-screw 67. The mandrel 79 extends through an opening 80 in the spider 53 and is prevented from entirely separating therefrom by lock nuts 83 which are larger than the opening 80. Thus the rolls 61 are prevented from falling out of place when the device is removed from the tube.

The second operation, therefore, is to clamp the jaws 3, 5 over the cup 51 (formed by the first operation), after the spider 53 has its extension 56 entered into the cup 51, the mandrel 79 at this time having been backed off by means of the lead-screw 67 so as to permit of collapse of the bead rolls 61 so that they may enter the cup.

The crank hub 73 is then taken out of engagement (if it happens to be in engagement) with the nut 69, thus leaving said nut 69 to be frictionally held by the jaws 3, 5. The crank 75 with its hub 73 in position on the nut 71 is then turned. This feeds the lead-screw 67 to the left (Fig. 7) and forces the mandrel 79 to expand the bead rollers 61 laterally. The mandrel 79 does not necessarily turn at this stage, the bearings 81 permitting the relative motion required between the lead screw 67 and said mandrel 79. After the mandrel has been suitably tightened into position so as to laterally expand the bead rolls 61, the hub 73 may be slipped to the left so as to engage the nut 69 of the spider 53. The spider 53 may then be rotated from the handle 75, thus forcing the rolls 61 around the periphery of the cup 51. When the spider 53 turns relatively freely, due to the rollers 61 having made an incipient groove, the hub 73 may be again disconnected from the nut 69 and by further turning the mandrel 79 may be again advanced. This operation may be repeated until the gudgeons 59 of the rollers 61 settle completely into the recesses 57 provided therefor. Thus the depth of the groove or bead 85 is limited to a predetermined amount. After the operation is complete, the lead-screw may be slightly retracted and the clamps 3, 5 removed. A peripheral recess 82 is left in the clamps 3, 5 for accommodating the rolling of the bead or passage 85.

After the rolling tool has been removed, openings such as shown at numerals 87 (Fig. 14) may be formed in the beads for the purpose of pouring in the sealing material when a connection is made at the field of operations. It will be understood that the openings may have been formed in the proper position in the conduit before expanding so that they pass through the bead after the described forming operations have been completed.

It will be seen that this device, or a similar one, takes the place of the conventional threading taps and dies, whether used at the point of fabrication or of installation and that it produces with despatch an improved, strong, smooth-bore joint. All that is necessary is, after forming the ductile tubing (including pipe or fitting), to deform one end of one length including forming the bead 85, as above described, form openings therein, telescope another length and pour in sealing material such as fluid solder.

The openings 87 in the bead 85 may be entirely dispensed with, and the solder or other sealing material pre-introduced in a non-sealing phase into said bead 85 before coupling is effected. After coupling is effected, the bead 85 may be heated or otherwise treated to bring the sealing material into a sealing condition, thereby securely sealing the coupling.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. Rolling apparatus comprising a die adapted to fit over the end of a tube, expanding means adapted to fit within said tube, a nut adapted to be held by said die, a lead-screw threaded with said nut, a mandrel adapted to be forced into said expanding means by said lead-screw, and means for turning said lead-screw to force said mandrel.

2. A tube expander comprising a clamp adapted to be placed over the end of a tube to form a die, a nut adapted to be held by said clamp when placed over the tube, expanding means adapted to be placed in said tube before application of the clamp, a lead-screw threaded into said nut, and a mandrel driven by said lead-screw, said mandrel being adapted to turn and advance within the expanding means under action of said lead-screw.

3. A portable tube expander comprising hinged jaws forming a die, juxtaposed handles on said jaws adapted to be manually held together when said die is placed over the end of a tube, expanding means adapted to be placed within the tube, a lead-screw, means through which said lead-screw is threaded adapted to be held by the said jaws, and a crank on the lead-screw adapted to be manually operated to effect said expanding means.

4. Rolling apparatus comprising a die adapted to fit over the end of a tube, expanding means adapted to fit within said tube, means adapted to be held by said die against rotational motion therein, a lead-screw threaded into said last-named means, and a mandrel adapted to be forced into said expanding means by said lead-screw.

5. Rolling apparatus comprising clamping means adapted to fit over the end of a tube, said clamping means comprising a pair of hemicylindrical jaws hinged together along a pair of edges, expanding means adapted to fit within said tube, means including a peripheral flange, said jaws having an interior annular groove therein adapted to receive said flange and hold said last-named means against longitudinal motion, a lead-screw threaded into said last-named means, and a mandrel adapted to be forced into said expanding means by said lead-screw.

6. Rolling apparatus comprising a die adapted to fit over the end of a tube, means associated with said die for threadedly receiving a lead-screw, said means being substantially immovable with respect to said die when in operation, a lead-screw threaded through said means, a spider independently movable with respect to said die and said means, peripheral rollers held in said spider adapted to fit within said tube, and a mandrel associated with said lead-screw adapted, upon advance of said screw, to actuate said rollers to expand said tube against said die.

7. Rolling apparatus comprising a die adapted to fit over the end of a tube, threaded means associated with said die for receiving a lead-screw, said threaded means being substantially immovable with respect to said die when in operation, a lead-screw threaded through said means, expanding means independently movable with respect to said die and said threaded means adapted to fit within said tube, and a mandrel associated with said lead-screw adapted, upon advance of said screw, to actuate said expanding means to expand said tube against said die.

8. Rolling apparatus comprising a die adapted to fit over the end of a tube, means associated with said die for threadedly receiving a lead-screw, said means being substantially immovable with respect to said die when in operation, a lead-screw threaded through said means, a spider independently movable with respect to said die and said means, said spider having a flange at one end thereof adapted to abut the end of said tube, peripheral rollers held in said spider adapted to fit within said tube, and a mandrel associated with said lead-screw adapted, upon advance of said screw, to actuate said rollers to expand said tube against said die.

HAROLD K. RADER.